US008842000B2

(12) United States Patent
Day et al.

(10) Patent No.: US 8,842,000 B2
(45) Date of Patent: Sep. 23, 2014

(54) FIRE CONTROL SYSTEMS

(75) Inventors: Daryl Day, Carrollton, TX (US); Richard K. Hoofard, Dallas, TX (US); Brett A. Walford, Corinth, TX (US)

(73) Assignee: 4Front Engineered Solutions, Inc., Carrollton, TX (US)

( * ) Notice: Subject to any disclaimer, the term of this patent is extended or adjusted under 35 U.S.C. 154(b) by 7 days.

(21) Appl. No.: 13/551,528

(22) Filed: Jul. 17, 2012

(65) Prior Publication Data

US 2014/0022071 A1   Jan. 23, 2014

(51) Int. Cl.
 *G08B 23/00* (2006.01)

(52) U.S. Cl.
 USPC ........ 340/501; 340/628; 340/632; 340/693.6; 159/37; 159/54; 159/61; 454/252; 454/342; 454/249; 454/338

(58) Field of Classification Search
 USPC ........... 340/501, 628, 632, 693.6; 169/37, 54, 169/61; 454/252, 342, 249, 338
 See application file for complete search history.

(56) References Cited

U.S. PATENT DOCUMENTS

| | | | |
|---|---|---|---|
| 871,729 A | 11/1907 | McChord, Jr. | |
| 1,041,913 A | 10/1912 | Tyson | |
| 1,379,439 A | 5/1921 | Bott | |
| 2,014,032 A | 9/1935 | Sharpe et al. | |
| 2,952,320 A | 9/1960 | Bensen | |
| 3,524,712 A | 8/1970 | Petrie et al. | |
| 3,721,507 A | 3/1973 | Monteleone | |
| 4,093,402 A | 6/1978 | Van Holten | |
| 4,174,924 A | 11/1979 | Smithson, Jr. | |
| 4,248,572 A | 2/1981 | Fradenburgh | |
| 4,324,530 A | 4/1982 | Fradenburgh et al. | |
| 4,334,828 A | 6/1982 | Moffitt | |
| 4,662,823 A | 5/1987 | Cooke | |
| 4,722,608 A | 2/1988 | Salzman et al. | |
| 4,744,728 A | 5/1988 | Lednicer et al. | |
| 4,968,216 A | 11/1990 | Anderson et al. | |
| 4,975,022 A | 12/1990 | Perry | |
| 5,226,783 A | 7/1993 | Mita | |
| 5,320,494 A | 6/1994 | Reinfelder et al. | |
| 5,564,901 A | 10/1996 | Moore | |

(Continued)

FOREIGN PATENT DOCUMENTS

DE   3819145   12/1989
EP   1173359 A2   1/2002

(Continued)

OTHER PUBLICATIONS

U.S. Appl. No. 60/892,339, Mar. 1, 2007, Oleson.

(Continued)

*Primary Examiner* — Tai T Nguyen
(74) *Attorney, Agent, or Firm* — Perkins Coie LLP (57) ABSTRACT

Systems and methods for controlling a system of fans in a facility from a central system controller are disclosed herein. In one embodiment, the system of fans can be configured to shut down automatically during an emergency condition or event. For example, a fan system controller can be connected to the system of fans and provide a signal to each of the fans. While each of the fans receives the signal, power is connected to a motor on each of the fans. Upon detection of an emergency condition, the fan system controller disconnects the signal to the fans, thereby automatically simultaneously shutting down the entire system of fans.

16 Claims, 9 Drawing Sheets

(56) References Cited

U.S. PATENT DOCUMENTS

| | | | |
|---|---|---|---|
| 5,725,355 A | 3/1998 | Crall et al. |
| 5,785,282 A | 7/1998 | Wake et al. |
| 5,823,480 A | 10/1998 | La Roche |
| 5,860,788 A | 1/1999 | Sorensen |
| 5,885,059 A | 3/1999 | Kovalsky et al. |
| 5,927,948 A | 7/1999 | Perry et al. |
| 5,992,793 A | 11/1999 | Perry et al. |
| 6,039,541 A | 3/2000 | Parker et al. |
| 6,106,235 A | 8/2000 | Tettenborn et al. |
| 6,161,797 A | 12/2000 | Kirk et al. |
| 6,244,821 B1 | 6/2001 | Boyd et al. |
| 6,315,522 B1 | 11/2001 | Yamakawa et al. |
| 6,334,705 B1 | 1/2002 | Weetman |
| 6,431,498 B1 | 8/2002 | Watts et al. |
| 6,517,315 B2 | 2/2003 | Belady |
| 6,565,320 B1 | 5/2003 | Surls et al. |
| 6,589,016 B2 | 7/2003 | Boyd et al. |
| 6,719,533 B2 | 4/2004 | Bird |
| 6,776,578 B2 | 8/2004 | Belady |
| 6,817,835 B2 | 11/2004 | Boyd et al. |
| 6,884,034 B1 | 4/2005 | Parker et al. |
| 6,939,108 B2 | 9/2005 | Boyd |
| 6,976,829 B2 | 12/2005 | Kovalsky et al. |
| 7,246,998 B2 | 7/2007 | Kovalsky et al. |
| 7,252,478 B2 | 8/2007 | Aynsley |
| 7,284,960 B2 | 10/2007 | Aynsley |
| D587,799 S | 3/2009 | Oleson |
| D607,988 S | 1/2010 | Oleson et al. |
| 7,654,798 B2 | 2/2010 | Aynsley |
| 7,658,232 B2 * | 2/2010 | Anderson et al. ............... 169/61 |
| 7,726,945 B2 | 6/2010 | Grant et al. |
| D631,536 S | 1/2011 | Wiegel et al. |
| D635,237 S | 3/2011 | Fizer |
| 7,934,907 B2 | 5/2011 | Aynsley et al. |
| 7,955,055 B1 | 6/2011 | Boyd et al. |
| D641,075 S | 7/2011 | Fizer et al. |
| D642,674 S | 8/2011 | Oleson |
| 8,066,480 B2 | 11/2011 | Madsen |
| D650,893 S | 12/2011 | Fizer |
| 8,075,273 B2 | 12/2011 | Aynsley |
| 8,079,823 B2 | 12/2011 | Aynsley et al. |
| 8,123,479 B2 | 2/2012 | Klemo et al. |
| 8,142,156 B2 | 3/2012 | Wiegel et al. |
| 8,147,182 B2 | 4/2012 | Aynsley et al. |
| 8,147,204 B2 | 4/2012 | Scherer et al. |
| 8,152,453 B2 | 4/2012 | Oleson |
| 8,162,613 B2 | 4/2012 | Oleson et al. |
| D676,953 S | 2/2013 | Hollan et al. |
| D690,409 S | 9/2013 | Noble et al. |
| 8,529,212 B2 | 9/2013 | Smith et al. |
| 8,579,588 B1 | 11/2013 | Boyd |
| 8,622,712 B2 | 1/2014 | Wiegel et al. |
| 8,672,649 B2 | 3/2014 | Smith et al. |
| 2002/0001521 A1 | 1/2002 | Boyd et al. |
| 2002/0155807 A1 * | 10/2002 | Moor et al. .................... 454/342 |
| 2002/0182071 A1 | 12/2002 | Belady |
| 2003/0095864 A1 | 5/2003 | Ivanovic |
| 2006/0104812 A1 | 5/2006 | Kovalsky et al. |
| 2006/0187750 A1 | 8/2006 | Aldrich et al. |
| 2008/0008596 A1 | 1/2008 | Aynsley |
| 2008/0213097 A1 | 9/2008 | Oleson et al. |
| 2009/0072108 A1 | 3/2009 | Oleson |
| 2009/0178815 A1 | 7/2009 | Anderson et al. |
| 2009/0208333 A1 | 8/2009 | Smith et al. |
| 2009/0253364 A1 * | 10/2009 | Henry ............................ 454/229 |
| 2010/0034651 A1 | 2/2010 | Wiegel et al. |
| 2010/0034664 A1 | 2/2010 | Wiegel et al. |
| 2010/0104461 A1 | 4/2010 | Smith et al. |
| 2010/0247316 A1 | 9/2010 | Aynsley et al. |
| 2010/0278637 A1 | 11/2010 | Oleson et al. |
| 2010/0291858 A1 | 11/2010 | Toy |
| 2011/0081246 A1 | 4/2011 | Aynsley et al. |
| 2011/0156002 A1 | 6/2011 | Leatherdale et al. |
| 2011/0262278 A1 | 10/2011 | Fizer et al. |
| 2012/0128501 A1 | 5/2012 | Hoofard et al. |
| 2012/0177500 A1 | 7/2012 | Oleson et al. |
| 2012/0177509 A1 | 7/2012 | Aynsley et al. |
| 2013/0189104 A1 | 7/2013 | Hollan et al. |
| 2013/0251522 A1 | 9/2013 | Oleson |
| 2014/0023507 A1 | 1/2014 | Smith et al. |
| 2014/0072431 A1 | 3/2014 | Smith et al. |

FOREIGN PATENT DOCUMENTS

| | | |
|---|---|---|
| EP | 1619391 | 1/2006 |
| EP | 2271408 A1 | 1/2011 |
| GB | 100134 | 3/1917 |
| GB | 946794 | 1/1964 |
| GB | 2050530 | 1/1981 |
| GB | 219190 | 6/1988 |
| WO | WO-0049342 A2 | 8/2000 |
| WO | WO2006/022812 | 3/2006 |
| WO | WO-2009091443 A1 | 7/2009 |
| WO | WO-2010019472 A1 | 2/2010 |
| WO | WO-2013109711 A1 | 7/2013 |

OTHER PUBLICATIONS

U.S. Appl. No. 60/972,890, Sep. 17, 2007, Oleson.
U.S. Appl. No. 60/975,230, Sep. 26, 2007, Scherer et al.
U.S. Appl. No. 60/978,860, Oct. 10, 2007, Aynsley et al.
U.S. Appl. No. 61/025,852, Feb. 4, 2008, Toy.
747-400, Screenshot from http://www.boeing.com/commercial/747family/pf/pf_exterior.html; printed on Jul. 30, 2012.
Big Ass Fans Installation Guide Powerfoil X, Oct. 2009,2 pages.
Boeing 747-400 Twin-Aisle Jet Airliner, USA Screenshot from http://www.aerospacetechnology.com/projects/747/7473.html, printed on Jul. 30, 2012.
Dairy Notes; University of California Cooperative Extension (May 1999).
Fairbank, "A Large Paddle Fan for Livestock Cooling" American Society of Agricultural Engineers, Jun. 1989, 16 pages.
General Exterior Arrangement 737, Screenshot from http://www.boeing.com/commercial/737family/pf/pf_exterior.html, printed on Jul. 30, 2012, 1 page.
Image: Winglet and nav light arp.jpg, Screenshot from http://en.wikipedia.org/wiki/Image:Winglet_and_nav_light_arp.jpg; printed on Aug. 11, 2008.
Jain et al., "Experiemental Investigation of the Flow Field of a Ceiling Fan," ASME Heat Transfer/Fluids Engineering Summer Conference, Paper No. HT-FED-2004-56226 (Jul. 2004) Abstract Only.
KC-135A in flight—closeup of winglet with attached tufts, Screenshot from http://www.dfrc.nasa.gov/gallery/Photo/KC-135/Small/EC79-11481.jpg; Dated: 1979.
KC-135A in flight-winglet study, EC79-11314, Screenshot from http://www.dfrc.nasa.gov/gallery/Photo/KC-135/Small/EC79-11314; Dated: 1979.
KC-135A in flight-winglet study, EC79-11484, Screenshot from http://www.dfrc.nasa.gov/gallery/Photo/KC-135/Small/EC79-11484; Dated: 1979.
NASA Dryden Technology Facts-Winglets, Screenshot from http://www.nasa.gov/centers/dryden/about/Organizations/Technology/Facts/TF-2004-15-D; printed on Jul. 30, 2012.
Rite Hite Fans Revolution Installation and Owner's Manual, Jul. 2010, 2 pages.
Technical Guide: Commercial Industrial & Special Application Ceiling Fans; Marley Engineered Products; Form No. ZDA-LEFTG; printed on Jul. 30, 2012.
Winglet Detail; screenshot from http://upload.wikimedia.org/wikipedia/commons/5/53/Wingletdetail.jpg; printed on Aug. 11, 2008.
Winglet Device; screenshot from http://en.wikimedia.org/wiki/Wingtip_device; printed on Aug. 11, 2008.
AirMotion™ Big Smart Fans™ 9-ft, Specifications Sheet, © 2012 AirMotion Sciences, Inc., 1 page.
AirMotion™ Big Smart Fans™ for Agricultural Facilities, flyer, © 2011 AirMotion Sciences, Inc., 2 pages.
AirMotion™ Big Smart Fans™ 12-ft, Specifications Sheet, © 2012 AirMotion Sciences, Inc., 1 page.

(56) References Cited

OTHER PUBLICATIONS

Airmotion Sciences, Inc., What Is Heat DeStratification, and How AirMotion™ Big Smart Fans™ Help Reduce Heating costs, © 2010 AirMotion Sciences, Inc., 1 page.

AirMotion™ AltAir™ eBrochure, 2010, © 2010 AirMotion Sciences, Inc., 20 pages.

AirMotion™ Big Smart Fans™ 15-ft, Specifications Sheet, © 2012 AirMotion Sciences, Inc., 1 page.

Wingtip device, Wikipedia, 12 pages, last modified Jul. 25, 2012.

Winglet Detail; screenshot from http://upload.wikimedia.org/wikipedia/commons/5/53/Wingletdetail.jpg ; printed on Aug. 11, 2008.

Advanced Blended Winglets, page last updated Feb. 6, 2004, The 737 Information Site, http://www.b7s7.org.uk © Chris Brady 1999, 9 pages.

Next-Generation 737 Production Winglets, © Boeing, Jun. 5, 2004 snapshot of http://www.boeing.com/commercial/737family/pf/pf_winglets.html through waybackmachine Internet Archive.

"The Intelligent Approach to Commercial / Industrial Ceiling Fans," Technical Guide, Commercial Industrial & Special Application Ceiling Fans, Leading Edge, A Marley Engineered Products Brand, © Leading Edge 1999, 32 pages.

Fact Sheets, Winglets, NASA, Screenshot from http://www.nasa.gov/centers/dryden/about/Organizations/Technology/Facts/TF-2004-15-D; printed on Jul. 30, 2012.

Revolution®, HV/LS Fan Installation and Owners Manual, first two pages, RITE HITE Fans, Pub. No. RF Rev. 9—Jul. 2010.

Montoya, Lawrence C., "KC-135 Winglet Flight Results," NASA Dryden Flight Research Center, pp. 145-156, 1979/1980.

Non-Final Office Action for U.S. Appl. No. 13/502,507, filed Nov. 22, 2011, mailed Apr. 17, 2014, 19 pages.

\* cited by examiner

FIRE CONTROL SYSTEMS

TECHNICAL FIELD

The following disclosure relates to systems and methods for controlling facility fans in response to an event.

BACKGROUND

Multi-blade, high volume low speed (HVLS) cooling fans are often used in warehouses, loading docks, and other large structures to provide a comfortable work environment and/or to maintain suitable temperatures for product storage. In many large structures or buildings, several fans are required to meet the airflow requirements of the entire structure.

In the event of a fire or other emergency, a rapid shutdown of a fan system may be desirable. In many commercial fan systems, however, each fan must be shut down independently. Independent shutdown can be time-consuming; particularly, for example, if the power controls for each fan are not located in the same location. In other fan systems, one or more of the fans may be individually wired to a building alarm system. Running wires from each fan to the building alarm system, however, can add complexity and/or increase the likelihood of system errors. Accordingly, a need exists for an efficient and robust facility fan control system.

DETAILED DESCRIPTION

The present disclosure describes various embodiments of apparatuses, systems, and methods for automatic shutdown of one or more fans upon activation of an alarm system. In one embodiment, a plurality of fans can operate in a daisy chain configuration. A first fan of the plurality of fans can be operably coupled to a system controller that is electrically connected to a power source and an alarm system (e.g., a fire alarm system in a warehouse or other facility). An electrical switch (e.g., a relay and/or a programmable logic controller) in the system controller can selectively couple the power source to the plurality of fans. For example, in one embodiment, the switch can be configured to close in response to a signal from the alarm system, and to open in the absence of the signal. In response to an emergency condition detected by the alarm system (e.g., a fire), the alarm system can cease providing the signal to the system controller, thereby opening the switch. The open switch in the system controller causes the system controller to cease providing a corresponding operating signal to the first fan, which in turn automatically turns off the plurality of fans.

In another embodiment, a plurality of fans can be electrically coupled to a network control system via the system controller. The network control system can send and receive network signals (e.g., operating instructions, data, etc.) to and from the fans, and the fans can be configured to cease operating if a particular network signal from the control system is interrupted. For example, in some embodiments, the alarm system can discontinue transmission of an operating signal to the system controller in response to an emergency condition (e.g., a fire). The absence of the operating signal at the system controller opens a switch therein (e.g., a relay or a programmable logic controller) that interrupts a network signal to the fans, thereby automatically shutting down the fans. In an alternate embodiment, the network control system can be directly connected to the alarm system without a system controller. In response to an emergency detected by the alarm system, the network control system can provide instructions to each fan in the fan system to shut down. As discussed in greater detail below, operating the fans in a daisy chain and/or network configuration can reduce system complexity, thereby improving operational control of the fan system during an emergency or other event.

Certain details are set forth in the following description and in FIGS. 1A-6B to provide a thorough understanding of various embodiments of the disclosure. Those of ordinary skill in the relevant art will appreciate, however, that the technology disclosed herein can have additional embodiments that may be practiced without several of the details described below and/or with additional features not described below. In addition, some well-known structures and systems often associated with fan control systems, apparatuses, and methods have not been shown or described in detail below to avoid unnecessarily obscuring the description of the various embodiments of the disclosure.

In the Figures, identical reference numbers identify identical, or at least generally similar, elements. Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below.

Figure 1A:
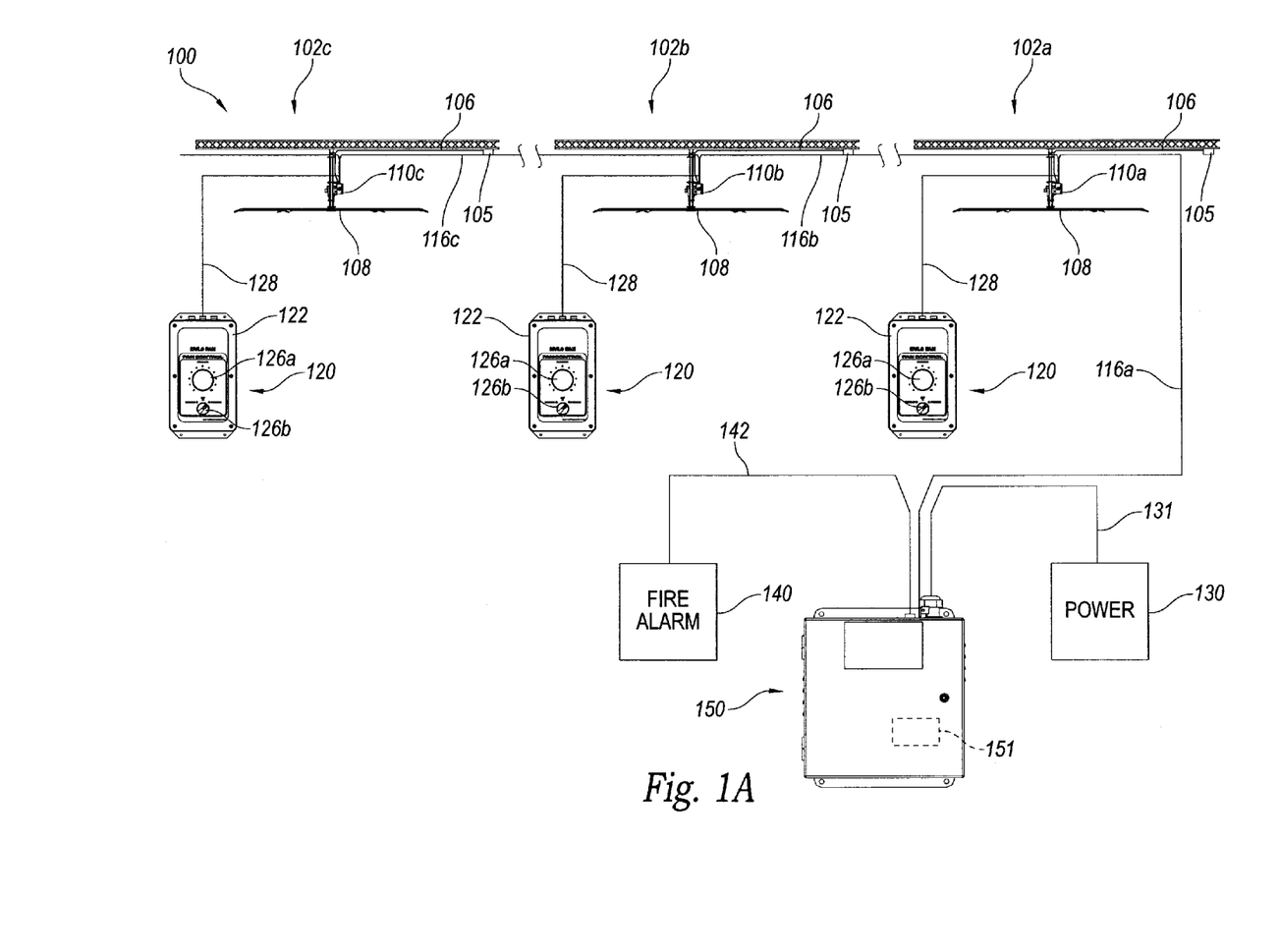
FIG. 1A is a schematic diagram illustrating a fan network control system configured in accordance with an embodiment of the present disclosure.

FIG. 1A is a schematic diagram illustrating a fan control system 100 configured in accordance with an embodiment of the disclosure. The system 100 includes a plurality of fans 102 (identified individually as a first fan 102a, a second fan 102b, and a third fan 102c) installed in, for example, a structure or building space. In the illustrated embodiment, only three fans are shown. In some embodiments, however, the system 100 may comprise only the fan 102a, while in other embodiments the system 100 may comprise four or more of the fans 102. Each fan includes a corresponding control module 110 (identified individually as a first fan control module 110a, a second fan control module 110b, and a third fan control module 110c) coupled to a corresponding fan drive motor (not shown) configured to rotate a set of fan blades 108. A power input 105 couples a power source (e.g., building electrical power, a generator, etc.) to the control module 110 on each fan via a power cable 106. Each of the fan control modules 110 can be configured to control and/or provide power to its corresponding fan drive motor (not shown) using a suitable fan drive unit as known to those skilled in the art (e.g., a variable frequency drive unit, a direct drive unit, a belt drive unit, etc).

In some embodiments, a remote manually-operated control unit 120 can be operably connected to each of the fans 102 via a link or control wire 128. The manual control unit 120 includes a housing or body 122 and one or more switches, actuators, buttons, knobs or other control features 126 (identified individually as a first control feature 126a and a second control feature 126b). In one embodiment, for example, the first control feature 126a can be configured to control the fan speed and the second control feature 126b can be configured to control, for example, fan direction. In other embodiments, the control features 126 can be reconfigured to perform any of the functions above and/or other control functions. In some embodiments, the control features 126 may be replaced by one or more control features on an electronic device wirelessly connected (e.g., via radio signals) to one or more of the fans 102. For example, the control functionality of the manual control unit 120 can be integrated into a mobile handheld device that can include a touchscreen interface and/or a touch-sensitive region (not shown) on the device.

In some embodiments, a control unit or central system controller 150 electrically couples an alarm system 140 to the fan system 100. In the illustrated embodiment, an electrical power source 130 (e.g., facility power, battery, etc.) can provide power to the system controller 150 via an electrical link 131 (e.g., an electrical cable, wire, etc.). An electrical link 142 (e.g., an electrical cable, wire, radio signals, etc.) electrically connects the alarm system 140 to the system controller 150. The fire alarm system 140 can be a conventional or other suitable fire alarm known to those of ordinary skill in the art. In one embodiment, for example, the alarm system 140 may include a fire alarm system configured to activate when, for example, a fire, smoke, and/or excessively high temperatures are detected.

In one aspect of the embodiment shown in FIG. 1A (and discussed in more detail below with reference to FIGS. 1B, 4A and 4B), the system controller 150 can transmit one or more electrical signals to an electrical signal input of the first fan control module 110a via an electrical link 116a (e.g., a wire, cable, radio signals, etc.). Similarly, an electrical link 116b can transmit an electrical signal between an electrical signal output of the first fan control module 110a and an electrical signal input of the second fan control module 110b, and an electrical link 116c can be configured to transmit an electrical signal from an electrical signal output of the second fan control module 110b to an electrical signal input of the third fan control module 110c. In this way, the system 100 can be coupled in series and/or a daisy-chain configuration such that, for example, disconnecting the first fan 102a from the system controller 150 automatically disconnects the second fan 102b and the third fan 102c from the system controller 150.

In some embodiments, the fans 102 can automatically turn off when in the absence of a particular electrical signal. For example, the system controller 150 can include a relay 151 (e.g., a switch, a programmable logic controller, etc.) configured to control one or more electrical enable signals from the system controller 150 to the first fan 102a. The relay 151 can be configured to receive an alarm operating signal via the electrical link 142 from a dry contact at the alarm system 140. Depending on whether the dry contact transmits the operating signal the relay 151 can be configured to change from a closed state to an open state (or vice versa). For example, the alarm system 140 can be configured to transmit the operating signal to the relay 151 during non-emergency conditions and to cease transmission of the operating signal upon detection of an emergency condition (e.g., a fire). The absence of the operating signal from the dry contact can open a circuit in the relay 151 and interrupt the transmission of the enable signal between the system controller 150 and the first fan 102a. As described above, disconnecting the first fan 102a from the system controller 150 automatically disconnects the second fan 102b and the third fan 102c therefrom. As described below with reference to FIG. 1B, the fans 102 can be configured to shut down in the absence of the enable signal. Thus, interrupting the enable signal at the relay 151 can automatically and/or simultaneously turn off all of the fans 102 in the system 100.

In other embodiments, the alarm system 140 can be configured to transmit the operating signal only when an emergency condition is detected. In one embodiment, for example, the relay 151 can be configured instead to open when receiving the operating signal and to close in the absence of the operating signal from the alarm system 140. Additionally, as those skilled in the art would appreciate, configurations of the relay 151 other than those described above can also be implemented.

In some embodiments, the alarm system 140 can include, for example, systems for detecting fires, natural disasters (e.g., an earthquake, a tornado, a flood, etc.); facility emergencies (e.g., a chemical leak, a security breach, rapid temperature change, etc.); other types of emergency conditions (e.g., exposure to biological, chemical, and/or radiological contaminants); and/or a combination thereof. In one or more embodiments, it may be beneficial for the system 100 to remain operating or to be automatically turned on (if the fan system is not already operating) in response to one or more of the foregoing events. The system controller 150 can be configured to provide the enable signal to any and/or all of the fans 102 in the event of certain types of emergencies and/or events. For example, if the alarm system 140 detects a chemical leak, an increase in the airflow from the system 100 can lead to increased ventilation and, thus, increase dispersion of chemical fumes.

Figure 1B:
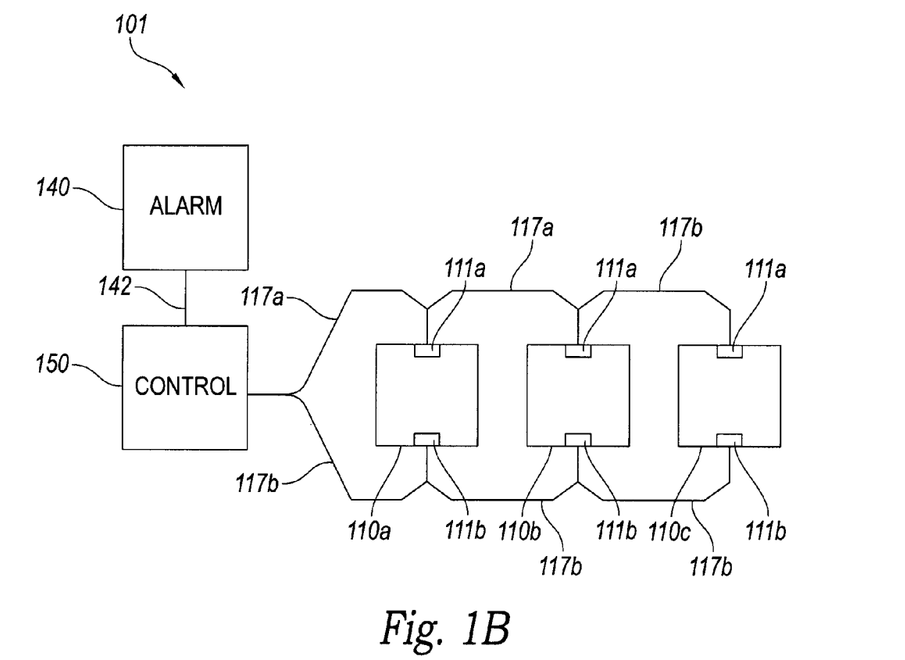
FIG. 1B is a block diagram illustrating a wiring configuration of the fan network control system of FIG. 1A.
Figure 3:
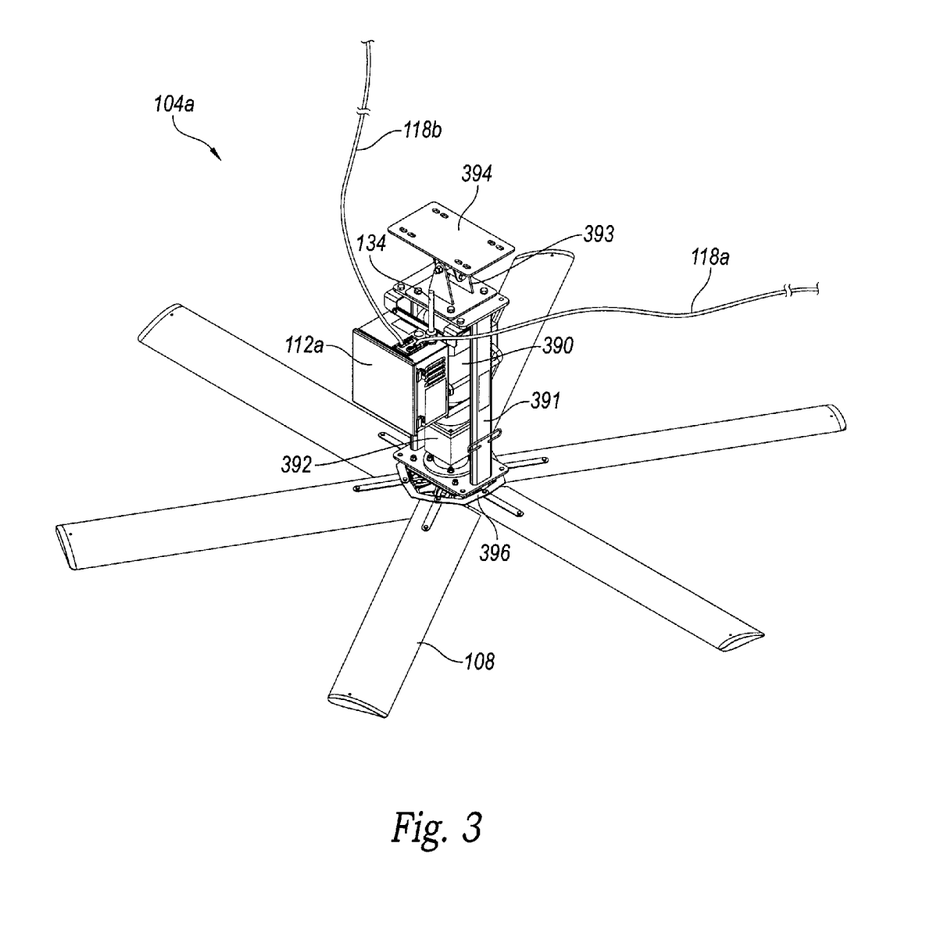
FIG. 3 is a top isometric view of a fan configured in accordance with an embodiment of the present disclosure.

FIG. 1B is a block diagram illustrating a wiring configuration 101 of the fan system of FIG. 1A in accordance with an embodiment of the disclosure. A first wire 117a and a second wire 117b couple the system controller 150 to a drive enable port 111a and a ground or common port 111b, respectively, on each of the fan control modules 110. The first wire 117a and the second wire 117b can, for example, be integrated into each of the electrical links 116 between the fan control modules 110 in a daisy-chain configuration as shown in FIG. 1B. Each of the drive enable ports 111a is configured to receive an enable signal (e.g., an electrical signal from the system controller 150) via the first wire 117a. While the drive enable ports 111a receive the enable signal, each of the control modules 110 can be configured to connect electric power to a corresponding fan motor (e.g., a motor as shown in FIG. 3 below). Conversely, if the enable signal is disconnected to the enable ports 111a, each of the control modules 110 can be configured to disconnect electric power to the corresponding fan motor.

Connecting all of the common ports 111b with the wire 117b in a daisy chain configuration can establish a shared common reference voltage between all of the fan control modules 110. A shared common reference voltage therebetween allows the use of the single enable signal to connect all of the enable ports 111a, instead of, for example, individually connecting all of the fan control modules 110 to the system controller 150 with separate wires and/or cables. As a result, disconnecting the enable signal to any of the fan control modules 110 disconnects the flow of the enable signal to all of the drive enable ports 111a, thereby shutting down all of the fans 102.

In the illustrated embodiment of FIG. 1B, the electrical link 142 couples the alarm system 140 to the system controller 150. As described above with reference to FIG. 1A, the system controller 150 can include the relay 151 to control the enable signal from the system controller 150 to the drive enable port 111a on the first fan control module 110a. As described above with reference to FIG. 1A, the alarm system 140 can include a dry contact configured to transmit the operating signal to the relay 151 that can change a circuit therein from closed to open or vice versa. The alarm system 140 can be configured, for example, to transmit the operating signal to the relay 151 during non-emergency conditions and to cease transmission of the signal upon detection of an emergency condition (e.g., a fire). Conversely, the absence of the operating signal from the dry contact can open the circuit in the relay 151 and interrupt the enable signal between the system controller 150 and the first fan control module 110a, thereby automatically turning off all of the fans 102 in the system 100.

Figure 2A:
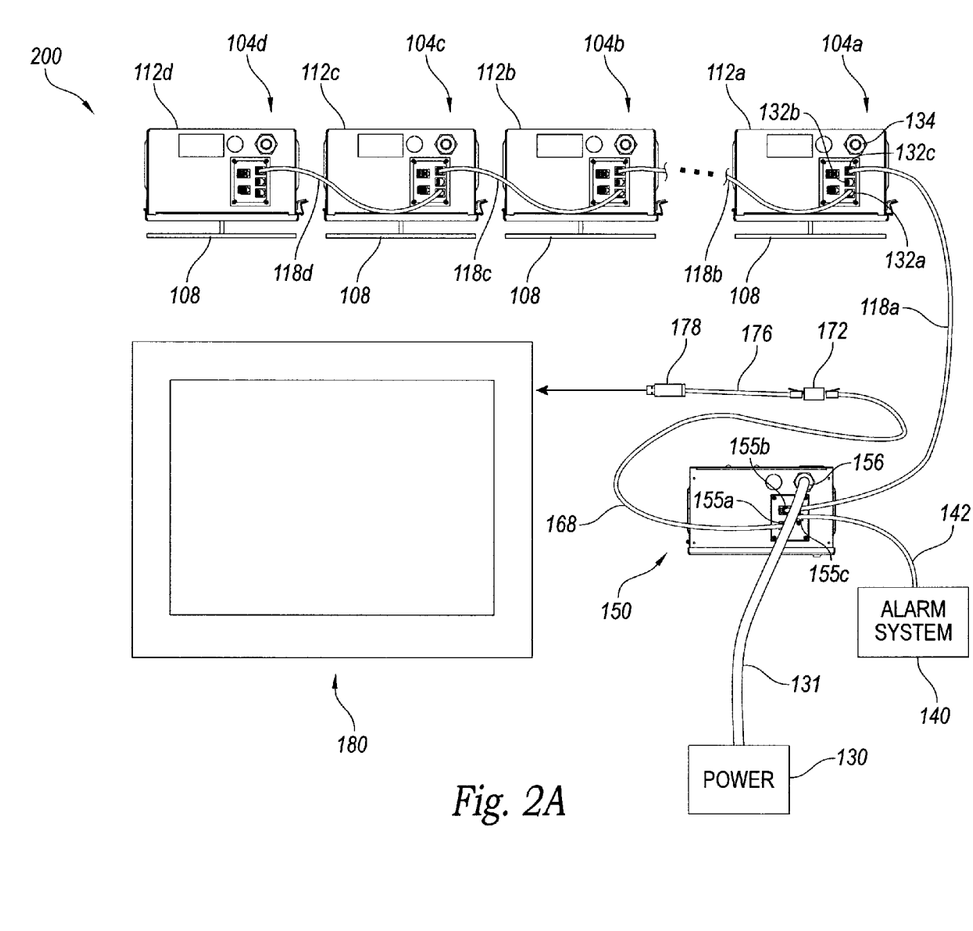
FIG. 2A is a schematic diagram illustrating a fan network control system configured in accordance with another embodiment of the present disclosure.

FIG. 2A is a schematic diagram illustrating a fan system 200 configured in accordance with an embodiment of the disclosure. The fan system 200 includes one or more fans 104 installed in, for example, a structure or building space and operably coupled to each other by a plurality of fan electrical links 118 (e.g., wires, cables, radio signals, etc.). The system controller 150 can operably couple the fan system 101 to one or more other systems including, for example, the alarm system 140 and/or a fan network control system 180.

In the illustrated embodiment, the fan system 200 includes a plurality of fans 104 (identified individually as a first fan 104a, a second fan 104b, a third fan 104c, and a fourth fan 104d). The fans 104 may be at least generally similar in structure and function to the fans 102 in FIG. 1A. In some embodiments, the fan system 200 may include only one fan 104, while in other embodiments the fan system 200 may include five or more fans. Each of the fans 104 includes a corresponding control module 112 (identified individually as a first fan control module 112a, a second fan control module 112b, a third fan control module 112c, and an fourth fan control module 112d). Each of the fan control modules 112 can be configured to control and/or provide power to a fan drive motor (not shown) using a suitable fan drive unit as known to those skilled in the art (e.g., a variable frequency drive unit, a direct drive unit, a belt drive unit, etc). Moreover, each of the fan control modules 112 can receive, for example, electric power and/or control signals from the system controller 150 via the corresponding fan electrical links 118 (identified individually as a first fan electrical link 118a, a second fan electrical link 118b, a third fan electrical link 118c, and a fourth fan electrical link 118d). Each of the control modules 112 can include one or more input ports 132 (identified individually as a first port 132a, 132 b, and 132c) configured to releasably receive an electrical link attached to, for example, one of the fan electrical links 118. An antenna 134 can be configured to receive wireless radio signals (e.g., a transmission of instructions and/or data).

The system controller 150 can include a cable gland or port 156 and a plurality of interfaces and/or input/output ports 155 (identified individually as a first port 155a, a second port 155b, and a third port 155c). The ports 155 can be configured to receive several suitable types of connectors and/or cables (e.g., electrical power cables, networking cables, coaxial cables, etc.), allowing electrical connection to the systems described above. For example, an electrical link 168 (e.g., an electrical cable or wire, a network cable, etc.) can be releasably inserted or otherwise coupled to the first port 155a to couple the network control system 180 to the system controller 150. A junction 172 can couple the link 168 to a network cable 176 having an end connector 178 (e.g. a USB plug) that can interface with the network control system 180 to provide data communication therethrough. Similarly, a first fan electrical connector or link 118a (e.g., an electrical power cable) can be releasably inserted into the second port 155b to couple the first fan 104a to the fan control interface 155. The electrical link 142 can be releasably inserted into the third port 155c to couple the alarm system 140 to the fan control interface 155. The power cable 131 can be releasably inserted into the port 156 to provide power from the power source 130 to the system controller 150.

As described above, the first fan electrical link 118a can carry an electrical signal (e.g. network data, instructions, etc.) and/or electrical current from the system controller 150 to the first fan control module 112a. The second fan electrical link 118b can carry an electrical signal and/or current between the first fan control module 112a and the second fan control module 112b. The third fan electrical connector or link 118c can carry an electrical signal and/or current between the second fan control module 112b and the third fan control module 112c. The fourth fan electrical link 118d can carry an electrical signal and/or current between the third fan control module 112c and the fourth fan control module 112d.

In some embodiments, each of the fan electrical links 118 can be configured to carry data to each of the fans 104 of the fan system 200. For example, the system controller 150 can be configured to couple the network control system 180 to the first fan 104a via the first fan electrical link 118a. The fan system 200 can be configured in a series and/or daisy-chain configuration such that, for example, cutting off data from the network control system 180 to the first fan 104a results in data being cut off to the second fan 104b, the third fan 104c, and the fourth fan 104d as well. As described above with reference to FIGS. 1A and 1B, the flow of signals and/or data from the system controller 150 can be controlled by the relay 151 based on one or more predetermined conditions. For example, if the alarm system 140 transmits a signal to the system controller 150 indicating an emergency condition, the relay 151 can block the flow of data and/or current to the first fan 104a, thereby automatically shutting down the entire fan system 200.

Figure 2B:
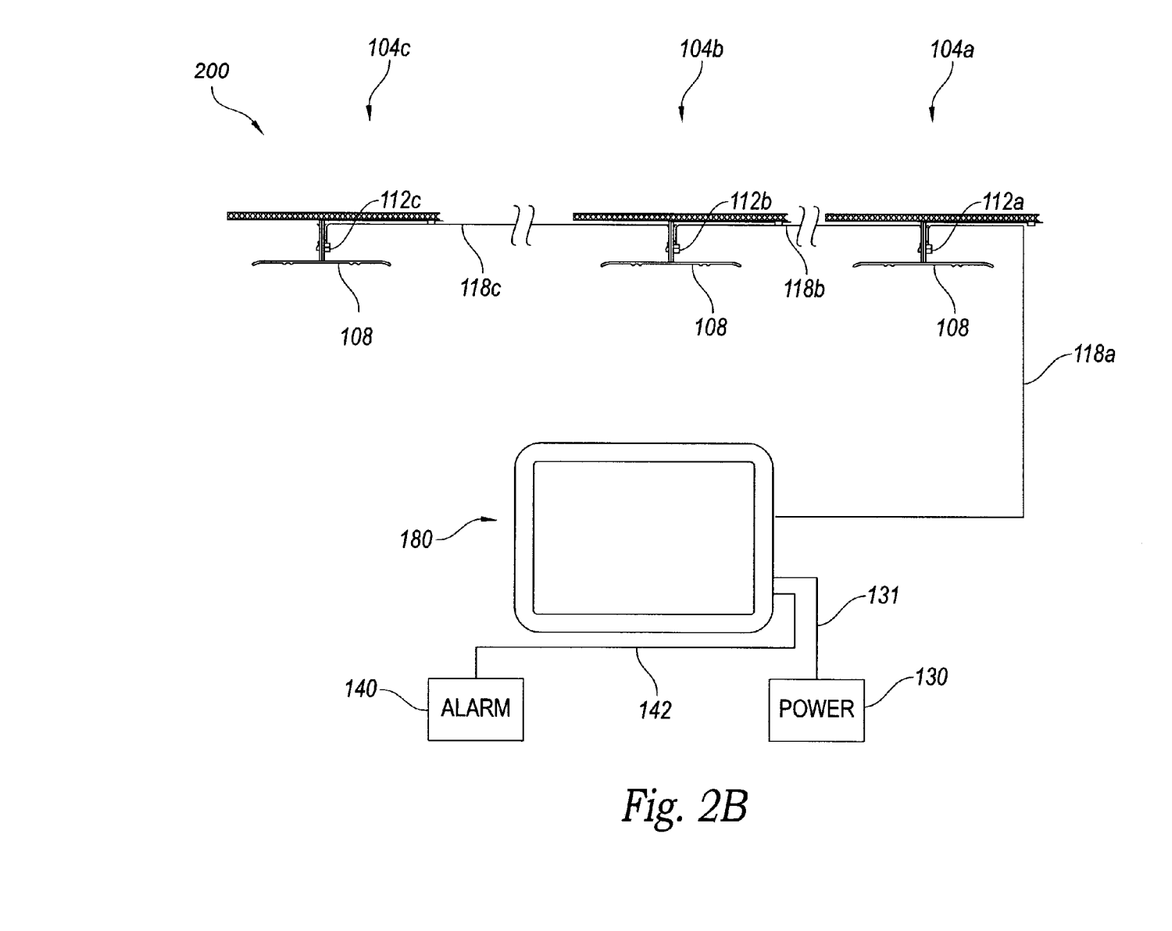
FIG. 2B is a schematic diagram illustrating a fan network control system configured in accordance with a further embodiment of the present disclosure.

FIG. 2B is a schematic diagram illustrating the fan system 200 configured in accordance with another embodiment of the disclosure. In the embodiment of FIG. 2B, the fire alarm system 140 is electrically coupled to the network control system 180 without the system controller 150. The network control system 180 can be configured to receive the operating signal directly from the fire alarm system 140 via the electrical link 142. Upon detection of an emergency condition, for example, the fire alarm 140 can cease transmission of the operating signal to the network control system 180. In response to the interruption of the operating signal, the network control system 180 can send instructions to each of the control modules 112 on the fans 104 to disconnect power to its corresponding motor, thereby shutting down the entire fan system 200.

Figure 2C:
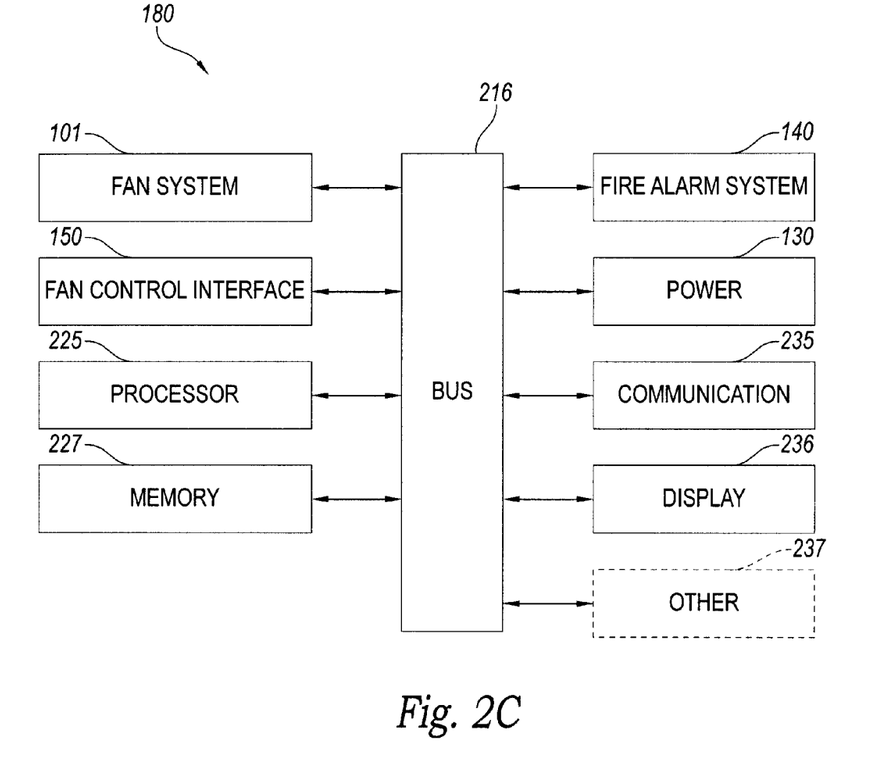
FIG. 2C is a block diagram illustrating operation of a fan network control system in accordance with an embodiment of the present disclosure.

FIG. 2C is a block diagram illustrating example components of the network control system 180. The system 180 may control components and/or the flow or processing of information or data between components of the system 200, such as, for example, the fan system controller 150 and/or the fan 104*a*, using one or more processors 225 in communication with memory 227, such as ROM or RAM (and instructions and/or associated data contained therein) and the other components of the system 200 via a bus 216. The memory 227 may contain data structures or other files or applications that provide information related to the control of the fan system 200.

Components of the system 180 may receive energy via the power component 130. Additionally, the system 180 may receive or transmit information or data to other modules, remote computing devices, and be linked via a communication component 235. The communication component 235 may be any wired or wireless components capable of communicating data to and from the system 180. Examples can include a wireless radio frequency transmitter, infrared transmitter, or hard-wired cable, such as a USB cable. For example, the communication component 235 may include a wireless system for transmitting instructions and/or information to the fans 104.

The system 180 can provide current system status to a display 236 (e.g., one or more computer monitors, televisions, Light Emitting Diodes (LEDs), etc.). The system 180 may also include other suitable components 237 not explicitly described here (e.g., additional microprocessor components, removable memory components (e.g., flash memory components, smart cards, hard drives), etc.) known to those of ordinary skill in the art.

FIG. 2C and the preceding discussion provide a brief, general description of a suitable environment in which the technology may be implemented. Although not required, aspects of the technology are described herein in the general context of computer-executable instructions, such as routines executed by a general-purpose computer. Aspects of the technology can be embodied in a special purpose computer or data processor that is specifically programmed, configured, or constructed to perform one or more of the computer-executable instructions explained in detail herein. Aspects of the technology can also be practiced in distributed computing environments where tasks or modules are performed by remote processing devices, which are linked through a communication network. In a distributed computing environment, program modules may be located in both local and remote memory storage devices.

Aspects of the technology may be stored or distributed on computer-readable media, including magnetically or optically readable computer disks, as microcode on semiconductor memory, nanotechnology memory, organic or optical memory, or other portable data storage media. Indeed, computer-implemented instructions, data structures, screen displays, and other data under aspects of the technology may be distributed over the Internet or over other networks (including wireless networks), on a propagated signal on a propagation medium (e.g., an electromagnetic wave(s), etc.) over a period of time, or may be provided on any analog or digital network (packet switched, circuit switched, or other scheme).

FIG. 3 is a top isometric view of the fan 104*a* configured in accordance with an embodiment of the disclosure. In the illustrated embodiment, the fan 104*a* is a high volume low speed (HVLS) cooling fan having a plurality of the blades 108 extending outwardly from a central hub 396. The fan control module 112 (FIG. 2) is operably coupled to a fan drive motor 390 (e.g., an electric motor) by means of a gearbox 392. The motor and gearbox assembly can be carried by a support frame 391 that is pivotally coupled to a mounting plate 394 by means of a universal joint 393. The mounting plate 394 can be fastened to a ceiling or other elevated structure using bolts or other suitable fasteners known in the art.

In the illustrated embodiment, the first fan control module 112*a* is shown. However, in other embodiments, other fan control devices and/or systems may be implemented, such as, for example, the fan control module 110 (FIG. 1A). Moreover, the fan 104*a* is merely illustrative of one type of fan that can utilize the fan control systems and devices disclosed herein. In other embodiments, other types of suitable fans (e.g., fans used in central air handling units, exhaust fans, fan-powered terminal units, etc.) can be used.

Figure 4A:
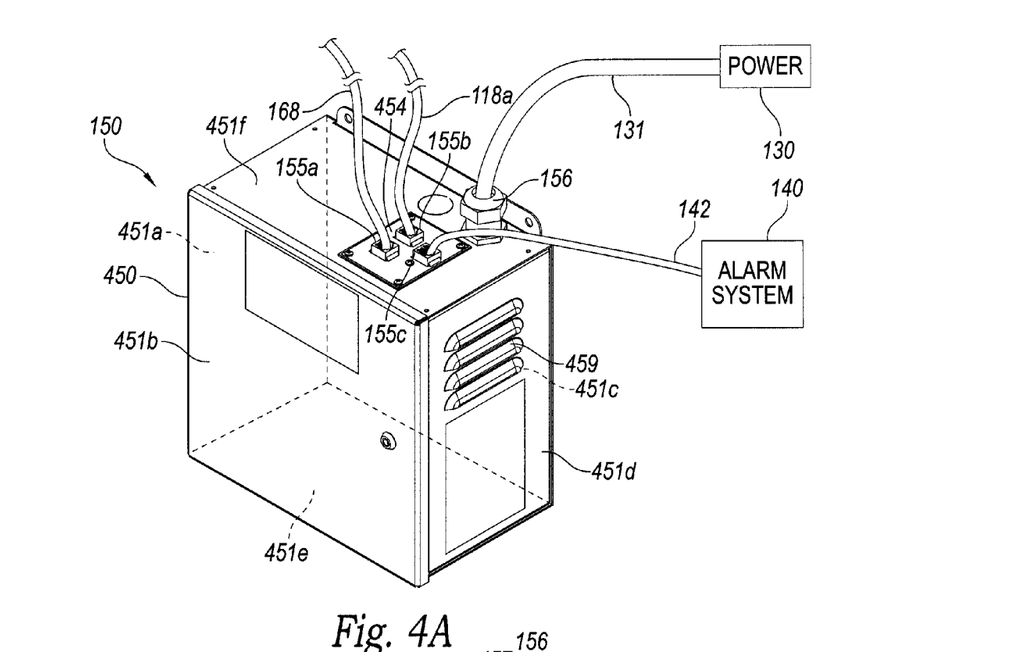
FIGS. 4A and 4B are isometric and side views, respectively, of a fan control interface of FIG. 1B.
Figure 4B:
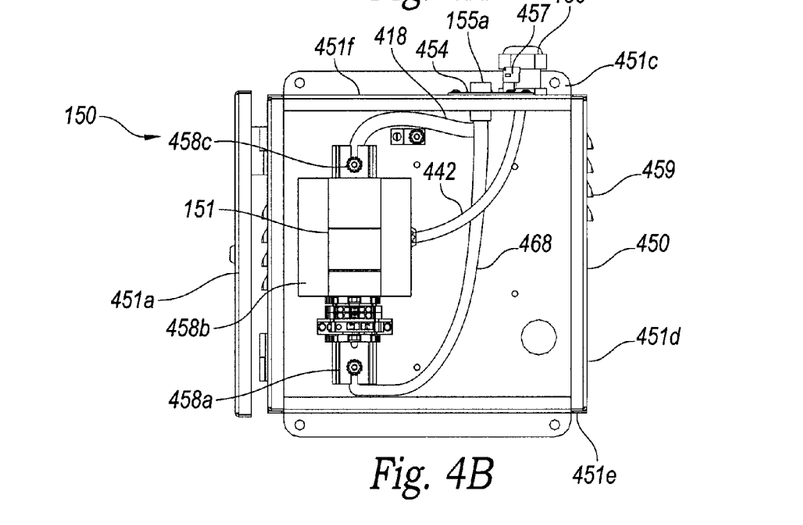

FIGS. 4A and 4B are isometric and side views, respectively, of the system controller 150. Referring first to FIG. 4A, the system controller 150 includes a case 450 having a rear panel 451*a*, a first side panel 451*b*, a second side panel 451*c*, a front panel 451*d*, a bottom panel 451*e*, and a top panel 451*f*. In the illustrated embodiment, the front panel 451*d* includes a vent 459 to provide, for example, ventilation for one or more components disposed within the case 450. An interface panel 454 in which the ports 155*a*, 155*b*, and 155*c* may be disposed on the top panel 451*f*.

FIG. 4B is a side view of the system controller 150 with the first side panel 451*b* removed for purposes of illustration. In the illustrated embodiment, a relay 151 is disposed within the case 450. In some embodiments, the relay 151 can be a Schneider Electric Model TWDLCAA24DRF PLC relay. In other embodiments, the relay 151 can be any suitable relay from other suitable sources. The relay 151 includes an input terminal 458*a*, a body 458*b*, and an output terminal 458*c*. A communication cable 468 couples the port 155*a* to the input terminal 458*a*. A fan communication cable 418 couples the output terminal 458*c* to the port 155*b*. A signal cable 442 can carry an electrical signal from, for example, the alarm system 140 to the relay 151. In some embodiments, for example, the relay 151 can be configured to block the flow of electrical signals and/or data upon interruption of the signal from the alarm system 140.

During operation of the fan system 200 (FIGS. 2A and 2B), the network control system 180 can transmit data to and from the fans 104 through the communication cable 468, the relay 151, and the fan communication cable 418. The data can include, for example, operating instructions and/or fan measurement information. In some embodiments, the fans 104 can be configured to automatically shut down upon disconnection of the data transmission from the network control system 180. As described above, for example, the alarm system 140, upon detection of an emergency event (e.g., a fire), can cease transmission of an operating signal to the relay 151 via the signal cable 442. The relay 151 can accordingly stop the flow of data therethrough, disconnecting the network control system 180 from the fans 104 and, as a result, automatically shutting down all of the fans 104 the fan system 200.

Figure 5:
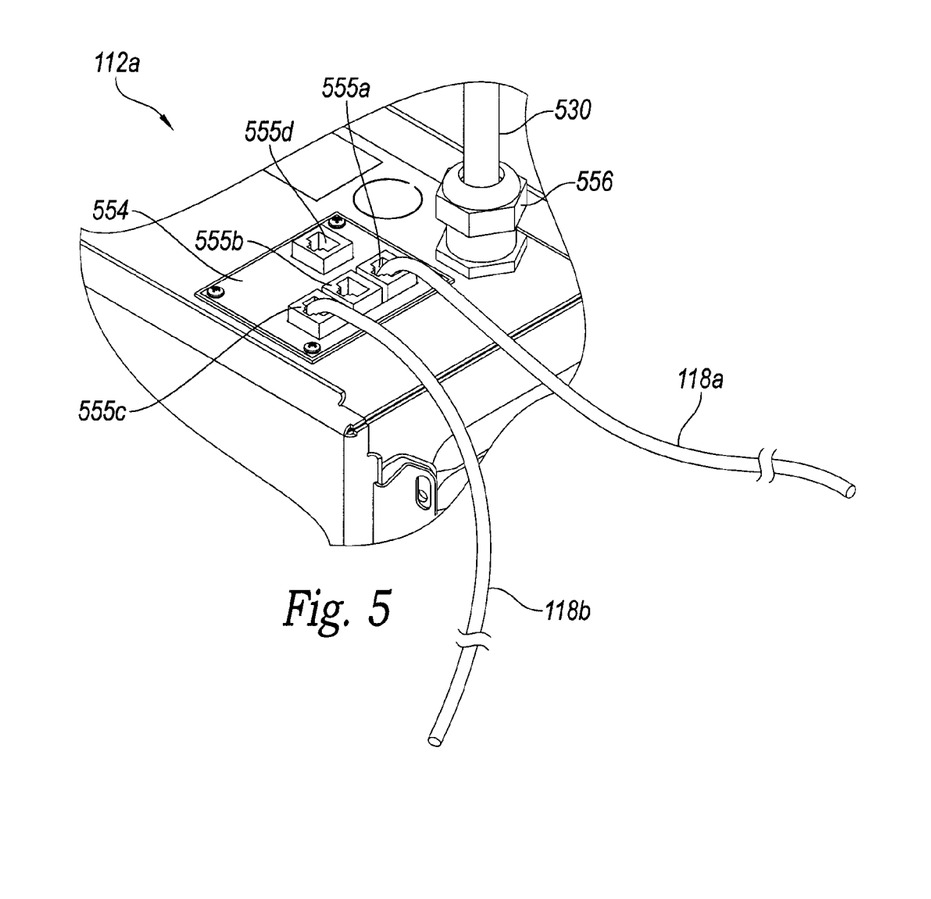
FIG. 5 is an isometric view of a portion of a fan control module configured in accordance with an embodiment of the present disclosure.

FIG. 5 is an enlarged isometric view of a portion of the fan control modules 112*a* (FIG. 1B) configured in accordance with an embodiment of the disclosure. An interface panel 554 on a top surface of the fan control module 112*a* includes a plurality of input/output ports 555 (identified individually as a first port 555*a*, a second port 555*b*, a third port 555*c*, and a fourth port 555*d*) disposed thereon. The ports 555 can be configured to receive electrical links (e.g. cables, wires, etc.) that can transmit electrical signals and/or data (e.g., operating instructions, measurements, etc.) between one or more fans in the fan system 200 (FIG. 1B). A cable gland or port 556 receives a power cable 530 that can provide electrical power to the fan 104 from an external power source (e.g., building power, one or more batteries, etc.).

In the illustrated embodiment, the fan control module 112a is shown as part of the fan network 200 (as shown in, for example, FIGS. 2A and 2B). The electrical link 118a can transmit one or more electrical signals (e.g., operating instructions) from the system controller 150 to the first port 555a, while the electrical link 118b can transmit the electrical signal from the third port 555c to the second fan control module 112b. The first port 555a and the third port 555c are electrically coupled by a switch (e.g. a relay and/or other suitable switch) disposed in the fan control module 112a. In some embodiments (e.g., the fan network 200 connected in a daisy-chain configuration, as shown in FIGS. 2A and 2B), the relay can be configured to open when the signal from the system controller 150 is interrupted. The open relay can cause the fan control module 112a to disconnect power to the motor of the fan 104a, and can correspondingly interrupt the signal to the second fan 104b and the third fan 104c. The interruption of the signal causes the second fan 104b and the third fan 104c to, in turn, shut down. In this way, turning off one fan (e.g., the fan 104a) can automatically turn off all of the fans 104 in the fan system 200.

Figure 6A:
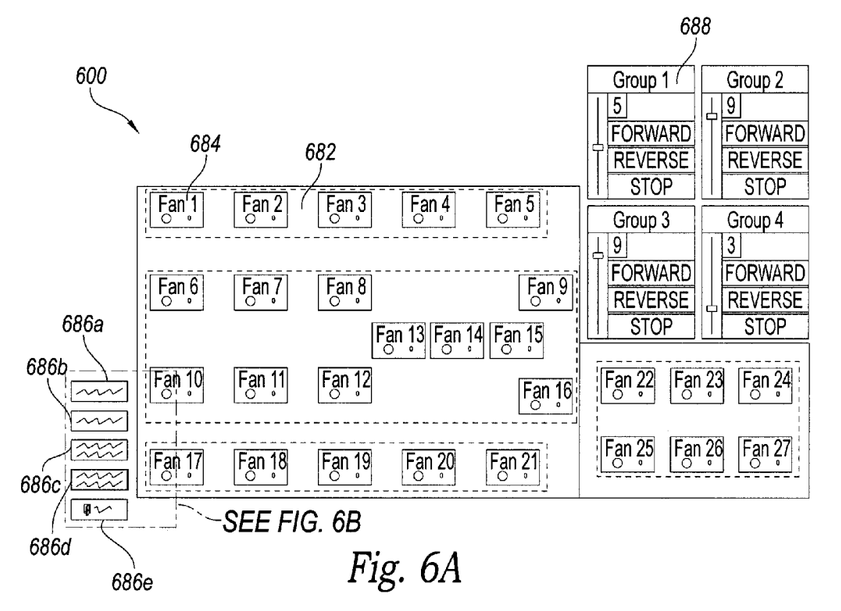
FIGS. 6A and 6B are front and enlarged front views, respectively, of a fan network control system interface configured in accordance with an embodiment of the present disclosure.
Figure 6B:
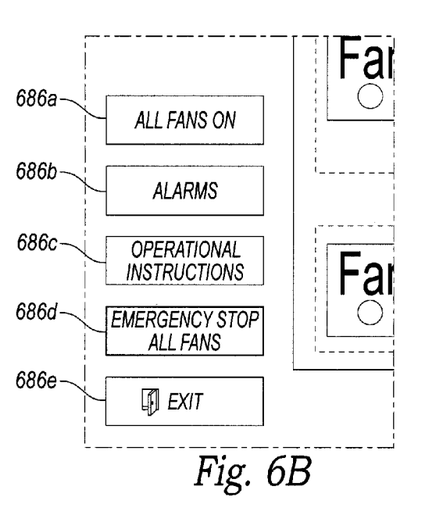

FIGS. 6A and 6B are front and enlarged front screen shots of a fan network control system user interface 600 configured in accordance with an embodiment of the disclosure. The interface 600 can be displayed via the network control system 180 discussed above. For example, in some embodiments, the interface 600 can be presented on the display 236 in FIG. 2C, or as a component of a separate control system. In the illustrated embodiment of FIG. 6A, the interface 600 can include a screen 682 containing one or more active areas or fan control icons 684. Each of the icons 684 can be configured to control the operation of an individual fan in a fan system (e.g., the fan system 200 shown in FIGS. 2A and 2B) in response to operator selection or activation. An operator, for example, can turn a particular fan on and off toggling one of the buttons 684 that represents the particular fan. One or more group controls 688 can be configured to operate a preset group of fans simultaneously.

FIG. 6B is an enlarged view of a portion of FIG. 6A containing a plurality of system buttons or icons 686 (identified as a first system control icon 686a, a second system control icon 686b, a third system control icon 686c, a fourth system control icon 686d, and a fifth system control icon 686e). In the illustrated embodiment, the first system control icon 686a can be configured to, for example, activate all of the fans simultaneously, when toggled or otherwise selected by the operator. The second system control icon 686b can be configured to, for example, display one or more screens showing an alarm status, when toggled on by the operator. The third system control icon 686c can be configured to, for example, display one or more screens showing operational instructions, when toggled on by the operator. The fourth system control icon 686d can be configured to, for example, shut down all of the fans simultaneously in the event of an emergency condition, when toggled on by an operator. The fifth system control icon 686e can be configured to, for example, exit the interface 600, when toggled by an operator. In other embodiments, other icons can perform other functions and/or certain of these icons can be omitted.

From the foregoing, it will be appreciated that specific embodiments of the disclosed technology have been described herein for purposes of illustration, but that various modifications may be made without deviating from the invention. Certain aspects of the disclosure described in the context of particular embodiments may be combined or eliminated in other embodiments. Further, while advantages associated with certain embodiments of the disclosed technology have been described in the context of those embodiments, other embodiments may also exhibit such advantages, and not all embodiments need necessarily exhibit such advantages to fall within the scope of the disclosed technology. Accordingly, the disclosure and associated technology can encompass other embodiments not expressly shown or described herein.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

In general, the terms used in the following claims should not be construed to limit the invention to the specific embodiments disclosed in the specification, unless the above-detailed description explicitly defines such terms. Accordingly, the actual scope of the disclosure encompasses the disclosed embodiments and all equivalent ways of practicing or implementing the disclosure under the claims.

We claim:

1. A fan system comprising:
a first facility fan;
at least a second facility fan;
a fan system controller configured to receive a first signal from an alarm system, wherein the alarm system is configured to transmit the first signal during a non-emergency condition and to cease transmission of the first signal upon detection of an emergency condition;
a first link connecting the fan system controller to the first facility fan, wherein the fan system controller is configured to transmit a second signal to the first facility fan via the first link when receiving the first signal from the alarm system, and wherein the fan system controller is further configured to cease transmission of the second signal to the first facility fan in the absence of receiving the first signal from the alarm system; and
a second link connecting the first facility fan to the second facility fan,
wherein the second link is configured to transmit the second signal from the first facility fan to the second facility fan when the first facility fan is receiving the second signal from the fan system controller;
wherein the first facility fan and the second facility fan are configured to operate when receiving the second signal, and wherein the first facility fan and the second facility fan are further configured to shut down in the absence of receiving the second signal.

2. The fan system of claim 1 wherein the first link is an electrical link that electrically connects the fan system controller to the first facility fan.

3. The fan system of claim 1 wherein the first link is a wireless link that wirelessly connects the fan system controller to the first facility fan.

4. The fan system of claim 1 wherein the alarm system is a fire alarm system and wherein the emergency condition is a fire.

5. The fan system of claim 1 further comprising:
at least a third facility fan connected to the second fan by a third link.

6. The fan system of claim 1 wherein the first fan and the second fan are high volume low speed facility fans.

7. The fan system of claim 1 further comprising:
a relay disposed in the fan system controller, wherein the relay is configured to disconnect the second signal to the first fan in the absence of receiving the first signal from the alarm system.

8. A method of operating a plurality of facility fans in a facility having an alarm system, the method comprising:
providing a fan system controller;
operably connecting a first one of the plurality of facility fans to a second one of the plurality of facility fans; and
operably connecting the fan system controller to the first facility fan and the alarm system, wherein the alarm system is configured to transmit a first signal to the system controller during a non-emergency condition and to cease transmission of the first signal upon detection of an emergency condition, wherein the system controller is configured to transmit a second signal to the first facility fan when receiving the first signal from the alarm system, wherein the system controller is further configured to cease transmission of the second signal to the first facility fan in the absence of receiving the first signal from the alarm system, wherein transmitting the second signal to the first facility fan automatically operates the first and second facility fans, and wherein ceasing transmission of the second signal to the first facility fan automatically shuts down the first and second facility fans.

9. The method of claim 8 wherein the alarm system is a fire alarm system.

10. The method of claim 8, further comprising operably coupling the second fan to at least a third fan, wherein ceasing transmission of the second signal to the first facility fan automatically shuts down the third facility fan.

11. A facility fan system comprising:
a first facility fan;
a second facility fan communicatively coupled to the first facility fan;
and
a fan system controller communicatively coupled to the first facility fan and configured to—
receive a first signal from an external signal source, wherein the external signal source is configured to transmit the first signal during a non-emergency condition and to cease transmission of the first signal upon detection of an emergency condition;
transmit a second signal to the first facility fan when receiving the first signal; and
cease transmission of the second signal to the first facility fan in the absence of receiving the first signal, wherein the first facility fan and the second facility fan are configured to automatically shut down when the first facility fan stops receiving the second signal.

12. The fan system of claim 11 wherein the external signal source is one of a fire alarm system, earthquake alarm system, tornado alarm system, or a combination thereof.

13. The fan system of claim 11 wherein the first fan, the second fan, and the third fan are configured to operate in a daisy chain configuration, wherein the controller is further configured to provide the second signal to the second fan and the third fan, wherein disconnecting the second signal to the first fan automatically disconnects the second signal to the second fan, and wherein disconnecting the second signal to the second fan automatically disconnects the second signal to the third fan.

14. The fan system of claim 11 wherein the fan system controller is configured to provide operating instructions to the first fan and the second fan, and configured to receive information from the first fan and the second fan.

15. The system of claim 11 wherein the first and second facility fans are configured to operate only if the second signal is received by the first facility fan.

16. A system for operating a plurality of fans in a facility having a fan system controller and an alarm system, the system comprising:
means for receiving a first signal from the alarm system at the fan system controller, wherein the alarm system is configured to—
transmit the first signal during a non-emergency condition, and
cease transmission of the first signal upon detection of an emergency condition;
means for providing a second signal from the fan system controller to a first one of the plurality of fans when the fan system controller is receiving the first signal from the alarm system;
and
means for interrupting the second signal in response to an interruption of the first signal, wherein the plurality of fans are configured to shut down in the absence of the second signal.

* * * * *